Patented Feb. 26, 1929.

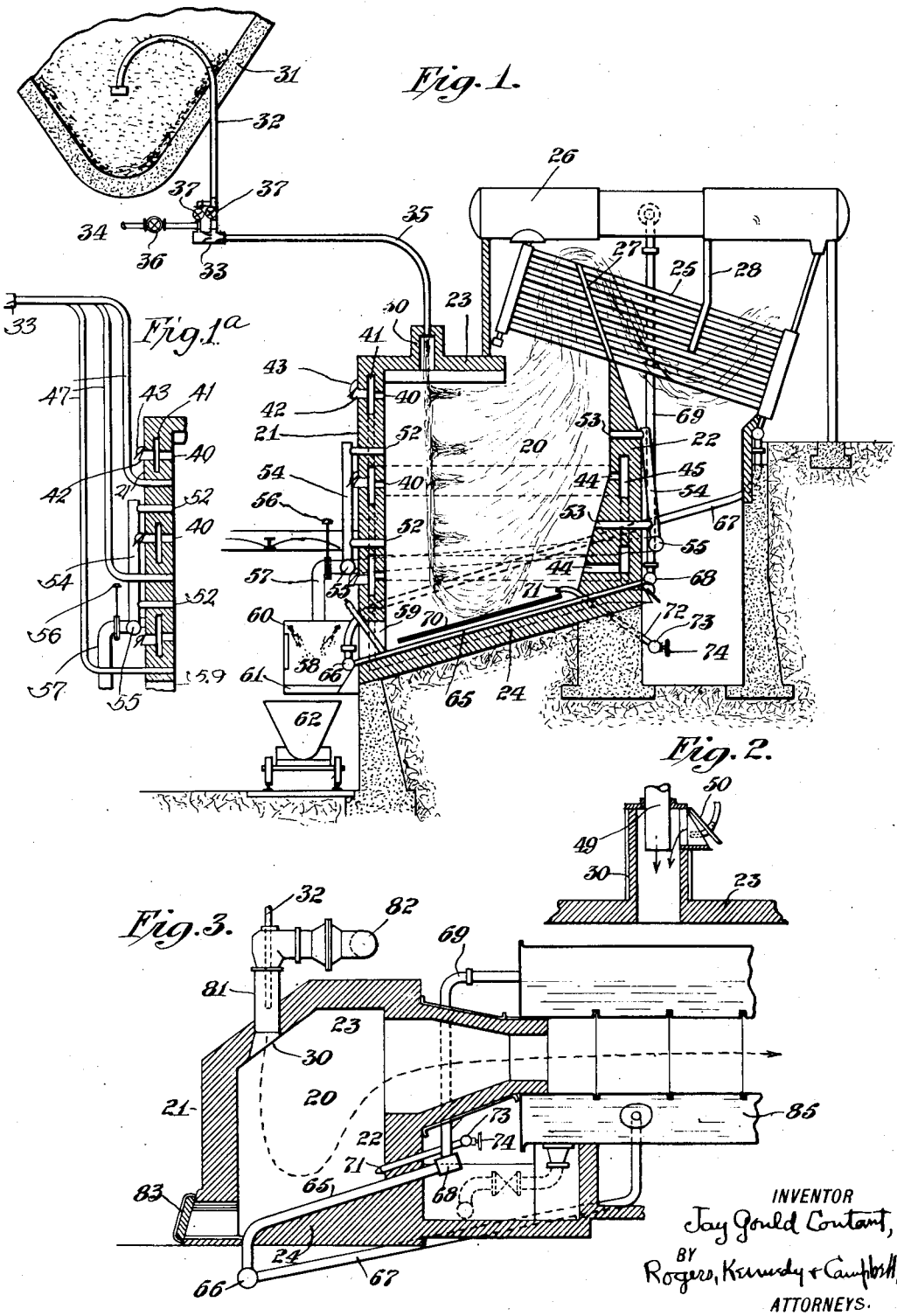

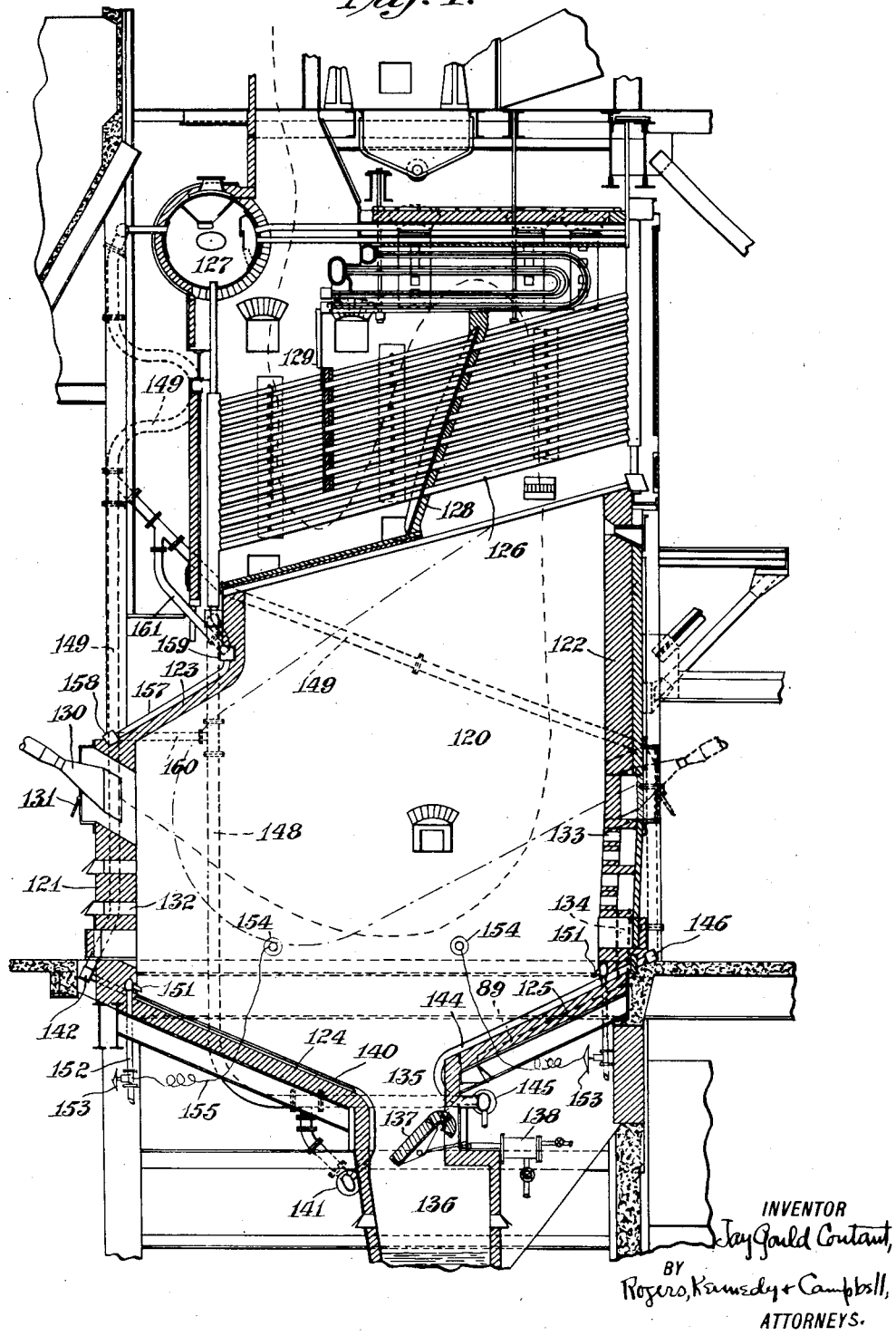

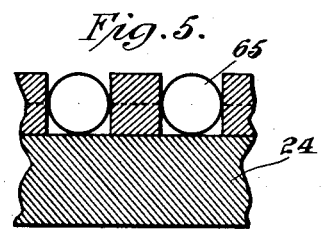
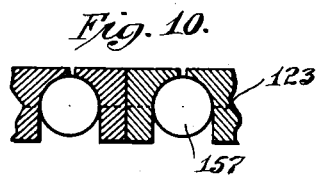
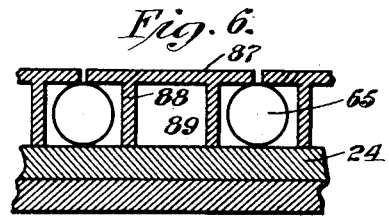
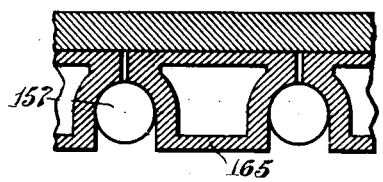
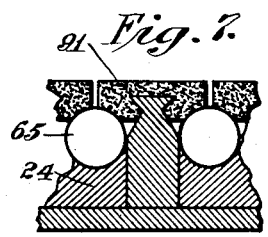
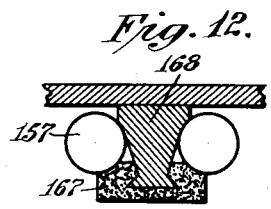
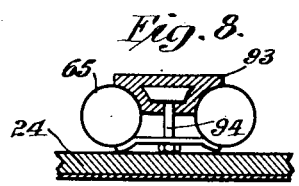
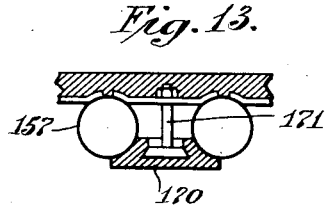
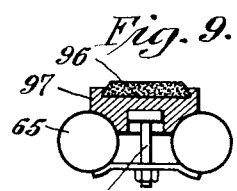
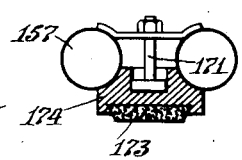
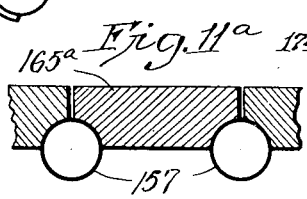

1,703,814

UNITED STATES PATENT OFFICE.

JAY GOULD COUTANT, OF NEW YORK, N. Y., ASSIGNOR TO FURNACE ENGINEERING COMPANY, INC., OF NEW YORK, N. Y., A CORPORATION OF NEW YORK.

PULVERIZED-FUEL COMBUSTION.

Application filed March 5, 1925, Serial No. 13,322, and in France March 7, 1924.

This invention relates to pulverized fuel combustion, and has reference both to the method herein disclosed and the apparatus or furnace for carrying out the same. The chief field of utility of the present invention is in the firing of various furnaces such as boiler furnaces, and as herein described the invention is primarily designed for the controlled combustion of pulverized coal, although equivalent fuel could in some cases be substituted.

General objects of the present invention are: to improve efficiency in firing furnaces with pulverized fuel, while increasing convenience of operation and durability of the furnace and minimizing upkeep cost; and further to afford such control over the combustion as practically to eliminate or minimize defects existing in methods and furnaces heretofore known.

The purposes of the present invention will be best explained by reciting some of the limitations and difficulties existing in the art and overcome or minimized by the present invention. One existing condition is that pulverized coal contains small particles of non-combustible mineral or ash which are capable of melting at certain high temperatures, varying for example between 1050° C. and 1300° C. Pronounced difficulties result from permitting the internal temperature at any part of the furnace to exceed the melting point of the ash, for at such high temperatures the ash is entrained by the moving gases, being held in suspension in the form of a fluid or vapor, which is capable of becoming deposited and hardening upon the walls and boiler tubes, and thus building up very objectionable coatings and projections, obstructing combustion, disintegrating the structure and compelling shut downs. On the other hand if the combustion temperature is not brought up substantially to the melting point of the ash there will be incomplete combustion of the carbon contents of the fuel and a prohibitive loss on that account, besides impairing the production of steam. Both of these defects occur although the average combustion temperature is at a suitable point, where the combustion is concentrated at certain places rather than evenly distributed, resulting in excessive temperatures and melting of ash at certain parts of the combustion chamber, and incomplete combustion at other parts. One of the objects of the present invention is to obviate these difficulties, and to permit much more uniform combustion conditions and temperatures to be maintained throughout all parts of the combustion chamber, thereby permitting the actual temperature to be maintained at the highest possible point without the dangers mentioned.

Another condition frequently encountered in practise is the desirability of greatly varying the evaporative action of the furnace, due for example to variations in the demand upon central power stations to meet varying municipal consumption of power. It may be desirable to increase the boiler operation to a point far above the normal rating, while at other times it may have to be reduced to a substantially subnormal point. One of the objects and advantages of the present invention is the ability afforded to increase greatly the rate of water evaporation to meet an overload, or on the contrary to maintain operation during subnormal periods, all without encountering the difficulties and losses usually prevailing under such variations of conditions.

The actual temperature existing in the combustion chamber depends mainly upon two factors, first, the rate of combustion of fuel, and second, the extent of boiler surface which is directly exposed to the radiation of the fire. Roughly the temperature may be said to vary in proportion to the quantity of fuel burned per unit of directly exposed boiler area, it being assumed of course that the combustion operations, including the supplying of combustion air and excess air or gas, are properly conducted to ensure a chamber atmosphere which is clear or sufficiently so for the radiant heat to penetrate effectively to the surrounding surfaces. A given increase, therefore in direct exposed boiler surface, permits a proportionate increase in the rate of fuel combustion without elevation of temperature; and this increase of combustion affords proportionate increase of evaporation, not only at the boiler surface directly exposed to the flames, but throughout the entire evaporating surface of the boiler, thus affording valuable increase of evaporation and service without incurring the drawbacks of excessive temperatures. It has heretofore been proposed to improve the rating of a furnace having a small direct exposed surface by introducing at the lower part of the combustion chamber the so-called "water screen," consisting of a few additional boiler tubes spaced apart between the combustion point and the ash chamber. The water screen however introduces substantial difficulties, for example that the intense heat developed adjacent the screen tends to oxidize the tubes and result in injurious explosions. During times of subnormal loads the combustion can not be considered economical for uses involving substantial variations in load; and they involve difficulties in the removal of ash and cause an increase in the size and initial cost of the furnace. The present invention avoids these several drawbacks.

Other and further advantages of the present invention will be elucidated in the herein following description, or will be apparent to those skilled in the art.

To the attainment of the above recited objects and advantages the present invention consists in the novel method of and apparatus for pulverized fuel combustion, and the novel features of method, operation, arrangement, combination and construction herein illustrated or described.

In the accompanying drawings Fig. 1 is a side elevation of a water tube boiler with furnace embodying the principles of the present invention, the near side wall being omitted to show the interior construction and operation. Fig. 1ª is a partial view corresponding with Fig. 1, but showing a modified arrangement for introducing the fuel.

Fig. 2 in similar view shows a modification of part of the apparatus shown in Fig. 1.

Fig. 3 is a central vertical, longitudinal section showing certain features of the present invention applied to that special type of furnace employed with Lancashire boilers.

Fig. 4 is a similar view showing the invention applied to a well known type of cross drum boiler furnace, embodying the present invention, and showing certain additional novel features, including a water cooled arch.

Fig. 5 is a detail cross section showing the water cooled construction of the combustion chamber floor as seen in Figs. 1, 3 and 4; and Figs. 6, 7, 8 and 9 show modified or alternative forms of floor construction.

Fig. 10 shows in detail cross section the water cooled arch construction of Fig. 4; and Figs. 11, 11ª, 12, 13 and 14 show alternative cooled arch constructions.

Referring first to the general furnace elements as seen in Fig. 1, the combustion chamber 20 is bounded by the front wall 21, the rear or bridge wall 22, the top and bottom walls 23 and 24, and the opposite side walls, all composed of high-heat-resisting refractories. A boiler is shown of the water tube variety, consisting of a bank of tubes 25 connected with the usual drum 26. A baffle 27 over the bridge wall and rear baffle 28 compel the hot gases to take the usual circuitous path to the stack.

In this embodiment the fuel admission 30 is shown in the top wall and consists of a nozzle or burner directed downwardly at a point spaced somewhat to the rear of the furnace front wall. It will be understood that there may be a series of such fuel entrances across the width of the furnace. The pulverized coal may be fed for example from a bin 31 through a curved fuel pipe 32 leading from the interior of the bin to an injector 33. The injector is preferably fed with steam, but sometimes by air, through a pressure pipe 34, and the induced flow of pulverized fuel is conveyed by pipe 35 to the fuel entrance 30. The action can be regulated by a control valve 36 in the pipe 34; and reversing valves 37 may be operated to cause air to be blown reversely through the pipe 32 to clear it in case of obstruction.

One feature of the present invention is to utilize more fully the entire capacity and volume of the furnace chamber by a better disposition of the flames, namely by avoiding the excessive concentration of heat at some points and distributing the combustion and heat as uniformly as possible through the chamber. This permits a greater rate of combustion to be maintained and a furnace or chamber temperature most favorable to efficiency and avoidance of difficulty, namely, preferably near to but slightly below the fusing point of the ash or incombustible in the fuel.

This control of combustion by regulating the distribution of the flames is herein shown effected by the mode of introduction of the fuel and air of combustion. For example in Fig. 1 the fuel is shown as injected in a downward direction, being propelled by steam only, assisted by gravity. The several downward fuel jets are acted upon by a series of lateral air jets. Thus three series, at three different levels or zones, of air admission apertures 40 are shown in the front wall, these serving to admit heated air and to direct it in the form of jets so as to impinge upon the descending fuel jets. The air inlets 40 at each level or zone are shown connected to a transverse wall passage 41, in which the air becomes heated, and the air may be supplied to this under pressure or by natural draft, for example through inlets 42 from the atmosphere, regulated, independently at each level, by dampers 43.

The action of this arrangement is indicated in Fig. 1. Each horizontal air jet strikes the downward fuel stream and deflects portions thereof inwardly, particles of fuel being entrained at the successive zones, so that the downward stream or flame is broken up into a number of lateral flames directed in a manner to distribute the combustion more thoroughly in the combustion space. The core of the fuel jet continues downwardly progressively reduced by the successive air jets and the dampers 43 permit regulation. The fuel particles carried inwardly by the air jets are supplied with additional air of combustion through rear wall apertures 44 supplied by wall passages 45.

The described arrangement may be supplemented by the additional fuel feed passages 47 shown in Fig. 1ª, or these may be employed in lieu of the passage 35 to inject the fuel laterally at a number of distributed points or zones. Fig. 2 shows an alternative in which a large fuel feed pipe 49 is employed delivering for example directly from a pulverizer, with a damper 50 for controlling supplemental air.

The next feature may be described as the regulation of the interior temperature by controlling the volume of the gases passing through the combustion chamber. Fluctuations in service demands result in a fluctuation of the temperatures. For example, when the steam production is high which necessitates the burning of more fuel this tends to build up in the chamber an excessive temperature. This is controlled and held down herein by the admission of quantities of steam, by which it is intended to include any inert gas, waste steam being suitable, so as to load the combustion gases, increasing their volume and rate of travel and thereby avoiding the existence of a temperature capable of affecting efficiency and safety as already referred to.

This feature is shown as carried out herein by the provision of a system of steam jets entering the combustion chamber through apertures 52 in the front wall, which may be in alternated alinement with the air apertures 40, so as to impinge upon and deflect portions of the descending flames. Other steam apertures 53 are shown in the rear wall. The several sets of apertures are interconnected through vertical pipes 54 and headers 55. A suitable valve 56 may be employed to regulate the admission of steam to the system from a waste steam pipe 57 leading from any suitable source of waste steam. An illustrative arrangement for supplying waste steam is indicated in the form of an ash chamber or box 58 into which hot ashes may pass from the combustion chamber through a front wall opening or door 59. Water sprays 60 within the chamber supply water to be evaporated by the heat of the ashes, the resulting steam passing out by the pipe 57 referred to. The ash box 58 may have an openable bottom 61 by which ashes may be periodically dumped into a receptacle or car 62.

I find that in cooperation the features already described, namely, the distribution control together with volume control, permit remarkable results in eliminating the objections recited, and will permit evaporation at rates varying from 20 to 40 kilograms per hour per square meter. At normal and over normal boiler operation the described features are adequate; but in cases of super demands above normal due to temporary high service requirements, demanding perhaps as much as four or more times the normal evaporation, the feature next to be described is found highly useful. The greatly increased rate of combustion, required by the very high duty, results in excessive temperatures notwithstanding a more uniform distribution of combustion, and it being impracticable to reduce such temperatures by supplying quantities of inert gas to increase the volume. The basic difficulty, as already stated, is that the usual boiler surface directly exposed to the radiant heat, while normally sufficient, will be insufficient, under the extreme conditions, to absorb the excess heat and keep the temperature down to the desired point. It is no solution of the difficulty, in cases of great variation of load, merely to increase the exposed boiler surface, for in that case the operation at normal and subnormal service is defective, due to unduly lowered temperatures and consequent incomplete combustion. The feature now to be discussed may be described as control or correction of temperature conditions, and prevention of excess temperatures, despite high fuel consumption, by varying the extent or area of boiler or cooling surface which is exposed to the radiant heat of the flames. This variation may be performed at will or by automatic means, and as herein explained the regulation may be such as even to double the exposed boiler surface during times of supernormal duty. For example at 275% rating the temperature might usually run to 1430° C.; then a partial increase of exposed heat absorbing surface would restore it to 1210° C. The regulation should be such as to prevent increase above 1210° C., and avoid ash fusion. With super-normal service of 400% to 500% of rating, tending to temperatures around 1575° C., the complete exposure to the flames of all available cooling surface will avail to preserve the desired 1210° C. The action is that the increased exposed surface effects absorption of the increased radiant heat and thus prevents the objectionably high temperatures and the drawbacks accompanying them. It will be seen that this regulation is to be more or less in accord with the rate of fuel consumption, the additional heat absorbing or boiler surface being thrown into action with increased combustion and vice versa.

In one aspect the additional cooling surface for the absorption of excessive radiant heat need not be boiler surface, but any water cooled elements, as superheaters, reheaters, air heaters or other heat absorbing surfaces which can be regulated in action so as to prevent excess temperatures and avoid fusion of ash. Whatever heat absorbing surface is employed, the principle of this branch of my invention is to adjust its action, for example by effectively covering or insulating it from the flames during normal or subnormal operation of the furnace, for example by a movable or removable shield or covering, and in case of excessive combustion to uncover or expose the cooling surface, this exposure to be proportional to the requirements, or intermittent in action to secure equivalent results; preferably with exterior control means, operated for example by hand.

Fig. 1 shows an illustrative embodiment. The supplemental cooling surface here consists of added boiler tubes 65 arranged upon the bottom wall of the combustion chamber, and substantially constituting a water cooled floor. I herein use the terms bottom and floor in the different senses that a floor connotes a bottom surface which is not so steep as to be self discharging by gravity; and either floor or bottom involving a substantially closed surface facing the combustion as distinguished from a mere screen through which ashes may settle. In using the term water it is intended generally to include water either in liquid form or as steam. In the water bottom or floor hereof there may be a bank of such tubes, spaced slightly apart, extending across the width of the furnace, and with the refractory bottom they may be inclined more or less, as shown. They are shown interconnected at their lower ends by a header pipe 66, having a water connection 67 by which water is brought from the lower part of the boiler to the tubes 65. A header 68 at the upper ends of the tubes has a steam connection 69 conducting the steam from the floor tubes to the boiler drum 26. This floor or bank of water cooled tubes is adapted readily to be shielded or exposed to the furnace flames, more or less, as will be explained. It will be observed that the tubes 65 are at the floor, and practically constitute the floor of the combustion chamber. This floor or bottom is believed to be new per se irrespective of the particular control effected by it; it presents toward the radiant heat a substantially continuous surface of high heat absorbing and conducting character which is arranged at a downward incline toward an ash discharge point, so that the chamber temperature is taken down or moderated by the absorption and its conduction to the circulating water, while ashes or other solid products of combustion which fall upon the inclined surface continue to be exposed to the radiant heat while moving along down the surface toward the ash discharge point and are protected from melting and slagging by the chilling effect of the water bottom.

While it is not necessary to protect the floor tubes 65 from direct radiation, this may be done by means of an overlying plate or members 70, which however should be of high heat conducting character, as well as proof from destruction by the heat. A plate or members composed of cast iron or of silicon carbide will serve, which should be upon the water tubes in any arrangement constituting direct boiler heating surface, so that the real cooling influence consists of the water tubes, the surface 70 absorbing the radiant heat and conducting it to the tubes, to be conveyed away with the water or steam flowing through the same.

The shielding means for the water cooled floor may consist of fuel ashes. Normally there would be a gradual covering or shielding of the surfaces 65 or 70 by the ashes accumulating thereon. Such ashes serve to insulate more or less the surface against the internal heat; therefore normally the additional heat absorbing surface or floor may be, with a thick layer of ashes, practically inoperative. According to the present invention however the action is regulated, and this may advantageously be done by more or less clearing off the accumulated ashes, or removing them entirely at regulated intervals, so as to effect the direct exposure of the cooling surface, thereby absorbing excess heat and reducing the combustion temperature. A ready means for clearing the accumulated ashes from the water cooled floor may consist of simple jets of steam or other gas. Thus a series of nozzles 71 is shown near the upper end of the inclined floor, and directed at the cooled surface. A series of pipes 72 conducts steam under pressure to the nozzles from a main or header 73 controlled by a cock 74. Mechanical or other ash removing means might be employed, but the jets serve the purpose, and by regulating the force of the jets the extent of exposure and cooling action is controlled. The ashes blown from the floor pass into the ash box 58 and from time to time are readily deposited in the dump car 62 and carried away.

The combustion control just described, namely control of radiant heat absorption by regulating the exposed cooling area, is of important utility per se and also in combination with the other features of control already described. Thus the control of flame distribution in the combustion space, giving a more uniform temperature above the water cooled floor, renders the heat absorbing action of the latter more effective. Also it is of substantial utility combined with the described gaseous volume control; because in a furnace wherein fluctuations are likely, to points excessively above normal, the gaseous volume control comes into utility at times of overnormal service, and the radiant heat absorption control in times of supernormal service. In each case the temperature is enabled to be maintained with practically substantial uniformity at a high point, not high enough to melt the entrained ashes or the refractory walls, but too high to cause loss by incomplete combustion of the combustible contents of the fuel.

The embodiment in Fig. 3 contains certain of the same principles as that of Fig. 1, but applied to a Lancashire boiler. The combustion chamber 20 has refractory walls at the front 21, rear 22, top 23, and bottom 24. The fuel burner 30 may comprise a pulverized fuel pipe as before, which is shown surrounded by an air pipe 81 to which air is fed by a pipe 82. The substantial path of combustion is as indicated by the dotted line. The front wall is shown having an ash removal door 83. The boiler 85 is cylindrical, with the draft passing longitudinally through it. No part of the boiler is directly exposed to the fire and objectionably high furnace temperatures would occur at high duty. One feature of the present invention is shown as applied in the form of water tubes 65 overlying the refractory floor of the combustion chamber. The lower ends of the tubes are connected to a header 66 to which water is conducted from the boiler by a pipe 67. An upper header 68 conducts steam from the tubes 65 through a pipe 69 to the upper part of the boiler. Ashes normally may accumulate on the tubes 65 and thus insulate them, but when it is desired to reduce the temperature the floor can be cleared of ashes through the steam nozzles 71 controlled by cock 74, and the ashes can be removed from time to time from the door 83. The extent of cooling pipe exposure can be regulated by varying the force of the steam jets and their frequency of operation.

By this invention the firing of the Lancashire boiler by pulverized coal is made practical. The increase of water evaporation will be very substantial. Where only seven kilograms per hour will be evaporated ordinarily this invention will increase steam production up to 21 or more, even as high as 30 kilograms per square meter of total boiler surface. Fig. 3 does not illustrate the flame distribution control feature hereof, but the employment of injected steam for volume control purposes may be effected either by injecting the necessary steam through the nozzle 71 or by including steam in the injection pipe 82.

Fig. 4 shows features of the present invention embodied in a modern type of cross drum water tube boiler furnace, in which the combustion chamber 120 is surrounded by a front wall 121, rear wall 122, arch 123, and a bottom which in this case comprises a front bottom wall 124 and a rear bottom wall 125, slanting downwardly toward each other. The boiler comprises tubes 126 and above them a transverse drum 127, with baffles 128 and 129 compelling the gases to take the circuitous path substantially as indicated by the dotted line. A fuel injecting means may consist of a series of burners 130 across the front of the furnace and these may for example deliver a mixture of pulverized coal and air directly from the pulverizers, a damper 131 regulating the admission of supplemental air. Additional air holes 132 may be provided in the front wall, and damper controlled; and these may be directed to impinge upon the flames from the burners. The rear wall is also shown provided with air apertures 133 for conducting preheated air into the furnace at that side.

Between the separated inclined bottom walls 124 and 125 is a space 135 which may be considered as an ash chute by which the ashes are discharged into an ash chamber or water box 136 below, in which a substantial depth of water is maintained. Means may be employed progressively to remove ashes from the bottom of the water box or trough. The dumping of hot ashes upon the water generates a certain amount of steam, which is delivered upwardly into the combustion space to increase the volume of the gases passing therethrough. A horizontal door or dump grate 137 is shown which may be closed or opened as desired by a water piston 138. When closed it shuts off the discharge of ashes and the admission of steam into the combustion chamber.

In order to increase the effective boiler surface exposed to radiant heat in times of excessive service there is shown resting on the bottom wall 124 a system of boiler tubes 140 constituting a water cooled floor. These tubes are interconnected at their lower ends by a header 141 and at their upper ends by a header 142. Analogous water tubes 144 constituting a flooring above the rear bottom wall 125 are interconnected by a lower header 145 and an upper header 146. A water pipe 148 brings water from the boiler to the lower headers 141 and 145 and steam pipes 149 conducts steam therefrom to the boiler drum 127. The systems of water cooled tubes 140, 144 constitute a supplemental heat absorbing surface, which can be shielded and rendered ineffective by allowing it to become covered with ashes. In order to give control of the action any device to clear off the ashes from either or both sides may be employed, for example systems of steam nozzles 151, supplied with steam by pipes 152, controlled by valves 153. By this combination, in times of high pressure duty, the valves 153 may be operated, in a regulated and intermittent manner, to keep the water cooled flooring more or less free from ashes, and therefore exposed to radiant heat; thus absorbing heat and preventing excess temperature, and at the same time increasing steam production.

The action may be automatically controlled in various ways through means to open or close the valves 153 as required by conditions. One mode of doing this is by means of pyrometers or thermostats arranged at the interior of the combustion chamber. Diagrammatically there are illustrated a pair of thermopiles 154 arranged to control electric circuits 155, which are indicated diagrammatically, the electric control extending to the special thermostatic valves 153, and serving to open or close them more or less, in any suitable manner, in accordance with the interior temperature. It may be arranged for example to maintain a temperature approximately 1205° C. If the temperature should exceed this and aproach the melting point of ash, 1300° C., the thermostats would effect control to open the valves and thereby clear the water tube floors so as to absorb radiant heat and bring down the temperature. If on the other hand the temperature should become depressed toward 1050° C., resulting in incomplete combustion, the operation would be to close off the valves 153 and reduce or remove the cooling effect of the floor tubes by allowing ashes to accumulate upon them.

A feature of value in this embodiment is the water cooled arch 123. This is shown as provided with water tubes 157 having a lower header 158 and an upper header 159, with a pipe 160 from the lower header to tube 148, and another pipe 161 from header 159 to tube 149. This protects the arch from overheating and the heat absorbed is utilized to increase steam production. I believe it to be new to protect the arch of a pulverized fuel furnace by a water cooling system therein. The details of structure will be hereinbelow further referred to.

The details of the various cooling tubes have not been fully described, but various arrangements are possible, such as those seen in Figs. 5 to 9 representing floor construction and Figs. 10 to 15 representing arch construction.

Thus Fig. 5 may represent substantially the floor tube arrangement as in Figs. 1 and 2 and the left side of Fig. 4, the refractory floor 24 having grooves in which the tubes 65 rest. Fig. 6 shows a special design of overlying or cover plate or bar 87 serving the same purpose as the plate 70 in Fig. 1. The plates 87 however have downward legs 88 enclosing air passages 89. Such passages are shown in dotted lines at the rear of Fig. 4, and serve to conduct hot air to wall passages 134 leading to the air apertures 133. In this case the heat absorbing floor is not only water cooled but also air cooled. Fig. 7 shows a modification in which refractory blocks 91 are locked in place above the tubes. Silicon carbide is a suitable refractory having high heat conducting properties. Fig. 8 shows a construction of an iron block or covering above the tubes. In this and the other cases the blocks may be slightly separated, leaving room for expansion. The iron block 93 is clamped by a device 94. Fig. 9 shows a silicon carbide block 96 held in an iron casting 97 clamped to the tubes.

The arch construction shown in Fig. 4 may be varied to correspond with Fig. 10, in which the water tubes 157 give support to refractory wall parts 123. Fig. 11 shows a different arrangement in which silicon carbide blocks 165 are substituted. Fig. 12 shows another arrangement in which a silicon carbide or similar refractory block 167 is held by ordinary refractory material 168 and thereby locked to the water cooled tubes. In Fig. 13 an iron block 170 is held by a clamp 171 to the tubes. In Fig. 14 a silicon carbide block 173 is mounted in cast iron 174 and clamped to the tubes.

The arch construction shown in Fig. 11 may be modified as shown in Fig. 11ª by reducing the extent to which the iron blocks 165ª stand outwardly from the outer wall, the blocks being shown solid instead of hollow.

A similar modification is indicated for the floor constructon shown in Fig. 5, the dotted lines showing that the altitude of the refractory blocks between the tubes may be reduced substantially as shown.

On Fig. 4 a variation is shown in dotted lines, namely a pulverized fuel injector or burner 130ª at the rear side of the furnace. This of course represents a series of such burners across the rear wall of the furnace, and these may be used in lieu of the front burners 130, in which case the substantial path of the combustion will be as indicated by the dot-and-dash line, extending down and across the furnace, and thence up under the arch and around to the exit. A further modification may consist in using both the front series and rear series of burners 130 and 130ª, in which case the flames will meet each other near the center of the furnace, and effectively spread and travel upwardly to the boiler.

Various features of invention herein disclosed but not made the subject of claim herein are hereby reserved for claim by division or continuation hereof; for example the features of invention disclosed in Fig. 4 hereof have been made the subject of claim in patent application filed by me March 17, 1927, Serial No. 176,137, which application embodies the disclosure of Fig. 4 hereof and constitutes a continuation or partial division hereof. Certain features of invention disclosed in Fig. 1 taken with Figs. 5 to 9 inclusive have been made the subject of claim in patent application filed by me August 18, 1928, Serial No. 300,571, containing Fig. 1 modified in accordance with Fig. 5 hereof and containing Figs. 5 to 9 hereof.

It will thus be seen that there has been disclosed a new pulverized fuel furnace and method of combustion carried out therein. Since many matters of operation, combination, arrangement, and structure may be variously modified without departing from the principles of the invention, it is not intended to limit the invention to such matters except so far as specified in the appended claims.

What is claimed is:

1. The method of pulverized fuel combustion consisting in injecting the fuel into the combustion space and distributing the heat of the flames throughout the volume to prevent over-concentration of temperature at any point, and preventing excessive temperatures by controlled variation of the extent of heat absorbing surface directly exposed to the combustion flames.

2. Method of pulverized fuel combustion in a boiler furnace chamber comprising injecting the fuel into the chamber, and air for complete combustion therein, and regulating the temperature in the combustion chamber by variation of heat absorbing surface directly exposed to the radiant heat therein by interposing a shielding layer between such surface and the heat of combustion.

3. Method of pulverized fuel combustion as in claim 2 and wherein the shielding layer is interposed for a part only of the radiant heat absorbing surface of the boiler while leaving another part thereof fully exposed to the radiant heat.

4. Method of steadying the temperature of combustion of pulverized fuel under varying conditions of forced operation in a boiler furnace chamber having direct exposed boiler surface in the bottom thereof, comprising injecting the fuel into the chamber, and air for complete combustion therein, and accumulating finely divided ashes in shielding relation to portions of the heat absorbing bottom surface directly exposed to the flames and causing such ashes to be more or less removed to increase or decrease the exposure as the combustion rate increases or decreases.

5. Method of control of pulverized fuel combustion in a boiler furnace chamber having boiler tubes as a floor to the combustion chamber comprising injecting the fuel into the chamber, and air for complete combustion, and accumulating on said floor finely divided particles of descending ash to shield the surface, and removing such particles therefrom to increase the exposure of cooling surface to the flames when tendency to excessive temperature exists.

6. Method as in claim 5 and wherein the removal of ashes is by jets directed to drive ashes downwardly along the floor and regulable to control the heat absorption by the floor.

7. Method as in claim 5 and wherein the removed hot ashes are applied to water to generate steam passing to the combustion space.

8. The method of pulverized fuel combustion comprising restricting the temperature to a point preventing the slagging of the ash content of the fuel notwithstanding high rates of combustion necessary for forced service consisting in maintaining a variable area of boiler surface directly exposed to the combustion flames and increasing such area with increased combustion rates and vice versa.

9. In a pulverized fuel furnace means for rendering substantially uniform the distribution of the heat of the flames and thereby preventing excessive concentration of temperature, and means at the same time preventing unduly high temperature by diluting the gases with inert gas as steam and other means for suppressing excessive temperatures by varying the area of heat absorbing surface exposed to the direct radiation of the flames.

10. In a pulverized fuel furnace means for rendering substantially uniform the distribution of the heat of the flames and thereby preventing excessive concentration of temperature and other means for suppressing excessive temperatures by varying the area of heat absorbing surface exposed to the direct radiation of the flames.

11. In a furnace for burning pulverized fuel, downwardly directed fuel burners, a combustion chamber having an exit at its upper part, and means for preventing the temperature reaching the melting point of the ash, comprising a heat-absorbing surface directly exposed to the radiant heat of the flames and arranged to receive an accumulation of ashes as a shield thereon, and means for varying the extent of such surface so exposed to the flames by more or less clearing such shield of ashes.

12. In a boiler furnace for burning pulverized fuel, inwardly directed fuel burners, a combustion chamber having an exit for the products of combustion, means admitting air sufficient for complete combustion therein, and means for maintaining the chamber temperature in the neighborhood of the melting point of the ash, comprising a heat-absorbing slag-preventing bottom surface adapted to be directly exposed to the radiant heat of the flames, and means for varying the extent of such surface so exposed to the flames.

13. In a pulverized fuel boiler furnace, a combustion chamber, means for admitting fuel and air sufficient for complete combustion therein, and means for controlling the temperature comprising a slag preventing bottom surface containing water passages in circulation with the boiler and exposed to the radiant heat of the flames, and means for varying the exposure thereof.

14. In the operation of a pulverized fuel boiler furnace having a boiler surface and a supplemental water cooled surface, both exposed to the radiant heat of the flames, the method of control for steadying the chamber temperature at approximately the melting point of the fuel ash consisting in causing to be exposed to the radiant heat to an increased extent the supplemental water cooled surface thereby to moderate the chamber temperature at periods of high combustion rate and tendency to excessive temperature and slagging, and at periods of low combustion rate and tendency to deficient temperature and incomplete combustion causing the water cooled surface to be shielded to an increased extent from the radiant heat.

15. In a boiler furnace burning pulverized fuel in suspension in air, the lateral walls enclosing the combustion chamber, and the means feeding the pulverized fuel and air thereto, in combination with an inclined water bottom to the combustion chamber comprising a system of inclined water circulation tubes, and presenting toward the radiant heat of combustion a substantially closed bottom surface of high heat absorbing and conducting character to prevent ash melting or slagging thereon, means for driving the finely divided unslagged ashes downward along the incline towards an ash discharge point, and a substantially sealed ash receiving chamber into which said discharge delivers.

16. In a boiler furnace burning pulverized fuel in suspension in air, the lateral walls enclosing the combustion chamber adjacent the boiler, and the means feeding the pulverized fuel and air to the chamber, in combination with a slag preventing bottom to the combustion chamber comprising a system of inclined water circulation tubes, and presenting toward the radiant heat of combustion a substantially closed metallic heat-absorbing bottom surface arranged at a downward incline discharging to an ash outlet.

17. In a furnace burning pulverized fuel in suspension in air, the lateral walls enclosing the combustion chamber, and the means feeding the pulverized fuel and air thereto, in combination with a water bottom to the combustion chamber comprising a system of water circulation tubes, and presenting toward the radiant heat of combustion a substantially closed bottom surface of high heat absorbing and conducting character, and arranged at a downward incline towards an ash discharge point; whereby the chamber temperature is moderated by the bottom's absorption of radiant heat and conduction to the circulating water, and whereby finely divided ash particles settled upon the surface of the water bottom are exposed to the radiant heat while moving along down the inclined surface but are protected from melting and slagging by the chilling effect of the water bottom.

18. A boiler furnace as in claim 17 and wherein the bottom tubes are in circulation with the boiler and enhance the steam output, and wherein particles moving down the inclined surface are subject to further combustion of any combustible remaining therein.

19. In a boiler furnace burning pulverized fuel in suspension in air, the lateral walls enclosing the combustion chamber, and the means feeding the pulverized fuel and air thereto, in combination with a water bottom to the combustion chamber comprising a system of inclined water circulation tubes, and presenting toward the radiant heat of combustion a substantially closed bottom surface of high heat absorbing and conducting character, adapted to receive and prevent slagging of the finely divided ash particles falling on the bottom, and arranged at a downward incline towards an ash discharge point.

20. In a boiler furnace burning pulverized fuel in suspension in air, the lateral walls enclosing the combustion chamber, and the means feeding the pulverized fuel and air thereto, in combination with a water bottom to the combustion chamber comprising a system of water circulation tubes in circulation with the boiler, and presenting toward the radiant heat of combustion a substantially smooth or even surface of high heat absorbing and conducting character, and arranged at a downward incline towards an ash discharge point; whereby the chamber temperature is moderated by the bottom's absorption of radiant heat and conduction to the circulating water, and whereby finely divided ash particles falling upon the surface of the water bottom are exposed to the radiant heat while moving along down the smooth or even inclined surface while protected from melting and slagging by the chilling effect of the water bottom.

21. In a furnace burning pulverized fuel in suspension in air, the lateral walls enclosing the combustion chamber, and the means feeding the pulverized fuel and air thereto, in combination with a water bottom to the combustion chamber comprising a system of water circulation tubes, and presenting toward the radiant heat of combustion a substantially closed surface of high heat absorbing and conducting character, and arranged at a downward incline towards an ash discharge point, and a substantially externally closed ash chamber arranged to receive the ashes discharged from said bottom.

22. A furnace as in claim 21 and wherein the discharge opening from the combustion chamber to the ash chamber is narrower than either chamber.

23. A furnace as in claim 21 and wherein the discharge opening from the combustion chamber to the ash chamber is provided with an openable gate.

24. A furnace as in claim 21 and wherein the circulation tubes of the water bottom are prolonged to extend into the ash chamber.

25. A furnace as in claim 21 and wherein the discharge opening from the combustion chamber to the ash chamber is narrower than either chamber, and the circulation tubes of the water bottom are extended through said discharge opening.

26. A furnace as in claim 21 and wherein is means for applying water to the hot ashes in the ash chamber to cool the ashes and deliver steam to the furnace.

27. In a boiler furnace burning pulverized fuel, a water bottom arranged at a downward incline toward an ash discharge point and containing circulation tubes connected with the boiler, a vessel arranged to receive the ashes discharged from the water bottom, said vessel being connected with the combustion chamber for delivery of steam to such combustion chamber, and means for supplying water to said vessel whereby the hot ashes can evaporate water and thereby furnish steam to the combustion chamber.

28. In a pulverized fuel furnace a combustion chamber having an ash receiving floor, an externally closed ash receiving chamber, connecting with the combustion chamber and adapted to receive hot ashes from the floor and to deliver steam to said combustion chamber, and means to introduce water into said ash chamber; whereby steam is generated by the hot ashes and transmitted to the combustion chamber.

29. In a pulverized fuel furnace means for rendering substantially uniform the distribution of the heat of the flames and thereby preventing excessive concentration of temperature, and means at the same time preventing unduly high temperature by diluting the gases, consisting in a pit or vessel arranged to receive the hot ashes and apply the same to water and to redeliver to the furnace the resulting steam.

30. In a furnace burning pulverized fuel in suspension in air, the lateral walls enclosing the combustion chamber, and the means feeding the pulverized fuel and air thereto, in combination with a water floor to the combustion chamber comprising a system of inclined water circulation tubes, and presenting toward the radiant heat of combustion a substantially closed floor surface of high heat absorbing and conducting character, arranged at a slight downward incline, upon which ashes may accumulate or be removed to an ash discharge point; whereby the chamber temperature is moderated by the floor's absorption of radiant heat and conduction to the circulating water, and whereby finely divided ash particles settled upon the surface of the floor are exposed to the radiant heat while moving along the inclined surface but are protected from melting and slagging by the chilling effect of the water floor.

31. A steam boiler furnace fired by pulverized fuel, its combustion chamber having an inclined and closed ash receiving floor with water cooled metallic surface exposed to the radiant heat of the combustion flames, upon which floor finely divided ash particles may accumulate without formation of slag, and from which floor such particles may be cleaned to maintain the exposure to the flames.

32. A boiler furnace as in claim 31 and wherein is an ash discharge toward which the water floor slants, means for driving ash downwardly along said floor to the discharge, and a substantially sealed ash receiving chamber into which said discharge delivers.

33. A steam boiler furnace fired by pulverized fuel, having an inclined water cooled floor presenting a metallic surface toward the flame and means for controlling the removal or accumulation of fuel ash on said floor, consisting of jets so located as to inject fluid slightly above or on said floor to drive the ash down said incline, and said floor constituting direct boiler heating surface exposed to the radiant heat, whereby the total direct boiler heating surface is regulable through such controlled accumulation or removal of ash particles from said floor.

In testimony whereof, I have affixed my signature hereto.

JAY GOULD COUTANT.